Patented Feb. 3, 1931

1,790,843

UNITED STATES PATENT OFFICE

KARL SCHIRMACHER, KARL ZAHN, ERWIN HOFFA, AND HANS HEYNA, OF HOCHST-ON-THE-MAIN, GERMANY, ASSIGNORS, BY MESNE ASSIGNMENTS, TO GENERAL ANILINE WORKS, INC., OF NEW YORK, N. Y., A CORPORATION OF DELAWARE

SUBSTITUTED THIOINDIGO VAT DYESTUFFS AND PROCESS OF MAKING THE SAME

No Drawing. Application filed August 1, 1924, Serial No. 729,637, and in Germany September 17, 1923.

The present invention relates to the new asymmetrical vat dyestuffs of the thioindigoid series being substituted by at least one alkoxy group.

More particularly our invention is concerned with the dyestuffs of the following general formula:

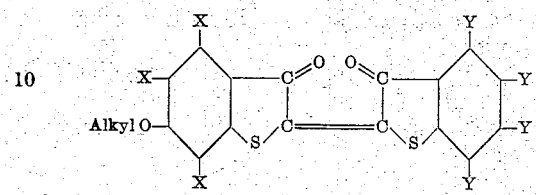

wherein X and Y represent hydrogen or any substituent, at least one Y being a substituent, the constitution being such that the lefthand side of the formula is not identical with the right-hand side of the formula. The said dyestuffs are in a dry state red powders, insoluble in water, alcohol and ether, soluble in nitrobenzene with a red color, soluble in concentrated sulfuric acid with a green color, forming with an alkaline hydrosulfite solution yellow vats, from which animal and vegetable fibers are dyed red shades which are fast to light, chlorine and washing.

Our new dyestuffs are obtainable either by subjecting the 1-aniles of such diketodihydrothionaphthenes as contain an alkyloxy group in meta position to the sulfur atom, and also their further substitution products substituted in the nucleus, to reaction with substituted ketothionaphthenes, the corresponding arylthioglycoliccarboxylic acids or with the acylketothionaphthenes obtainable from the said acids by condensation with acetic anhydride,—or inversely by subjecting 5-alkyloxythionaphthenes, their substitution-products substituted in the nucleus or the corresponding arylthioglycoliccarboxylic acids or acylketothionaphthenes obtainable from the said acids by condensation with acetic anhydride, to reaction with the 1-aniles of substituted diketodihydrothionaphthenes.

The great value of these dyestuffs resides in the fact that their shades approach that of the alizarine and that they possess excellent properties as to fastness. By introducing further substituents into one or the other nucleus it is possible to influence the shade towards blue or towards yellow.

The following examples illustrate our invention:

(1) 194 parts of 5-ethoxy-2-ketothionaphthene (likewise known as 6-ethoxy-3-oxy-1-thionaphthene) are dissolved in 4000 parts of glacial acetic acid and there are added 330 parts of 3 methyl-5-chloro-1.2 dihydro-2-ketothionaphthene-1-(p-dimethylamino)-anile (likewise known as 4-methyl-6-chlor-2.3-dihydro-3-keto-1-thionaphthene-2-(p-dimethylamino)-anile), which can be prepared by acting with nitrosodimethylaminile upon an alkaline solution of the 3-methyl-5-chloro-2-ketothionaphthene. This mixture is heated for some time until the separation of the new dyestuff is complete. The dyestuff separated by filtration forms, when dry, a red crystalline powder; when mixed with alkaline hydrosulfite it gives easily a vat while forming a yellow solution. It dyes cotton a fast clear red shade.

The same result can be obtained by using 3-methyl-5-chloro-2-acetyl-oxythionaphthene

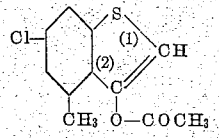

instead of 3-methyl-5-chloro-2-ketothionaphthene.

(2) If for the anile as used in Example 1 are substituted 375 parts of 3-methyl-5-bromo-1.2-dihydro-2-ketothionaphthene-1-(p-dimethylamino)-anile (obtainable like the chloro-compound) a similar dyestuff is obtained of a somewhat bluer shade approaching that of alizarine.

(3) 243 parts of 3-methyl-5-bromo-2-ketothionaphthene are dissolved in 2000 parts of nitrobenzene and 200 parts of glacial acetic acid, there are then added 326 parts of 5-ethoxy-1.2-dihydro-2-ketothionaphthene-1-(p-dimethylamino)-anile and the mass is heated to 80–100° C. until the formation of the dyestuff ceases. After cooling, that dyestuff is filtered off and washed. It is identical with the product obtained according to Example 2.

(4) 228,5 parts of 4-bromo-5-ethoxy-2-ketothionaphthene are subjected to reaction as indicated in Example 1 with 330 parts of the anile mentioned there. The resulting red dyestuff dyes cotton from the vat bluer shades than that obtained according to Example 1.

(5) 326 parts of 5-ethoxy-1.2-dihydro-2-ketothionaphthene-1-(p-dimethylamino)-anile are gradually heated to boiling with 233 parts of 3-methyl-4.5-dichloro-2-ketothionaphthene and 4000 parts of glacial acetic acid. The formation of the dyestuff is complete after some time. The product is filtered, washed with glacial acetic acid and dried. The dyestuff thus obtained dyes cotton a red shade with a blue hue.

(6) By substituting for the 5-ethoxy-2-ketothionaphthene as used in Example (2) 182 parts of 5-methoxy-2-ketodihydrothionaphthene a red dyestuff is obtained which dyes cotton a red shade with a blue hue.

(7) 256 parts of 4-ethoxyphenyl-2-thioglycol-1-carboxylic acid are heated to boiling with 330 parts of 3-methyl-5-chloro-1.2-dihydro-2-ketothionaphthene-1-(p-dimethylamino)-anile and about 2000 parts of acetic anhydride. After a short time, the dyestuff begins to separate. The mass is then heated until the formation of the dyestuff ceases. The dyestuff obtained dyes from the vat cotton a shade resembling alizarine.

(8) If for the anile used in example (7) are substituted 375 parts of 3-methyl-5-bromo-1.2-dihydro-2-ketothionaphthene-1-(p-dimethylamino)-anile and the further operations are carried out as indicated in this example, a dyestuff of a somewhat bluer shade is obtained.

(9) If for the 256 parts of 4-ethoxyphenyl-2-thioglycol-1-carboxylic acid as used in Example (1) are substituted 291 parts of 5-chloro-4-ethoxyphenyl-2-thioglycol-1-carboxylic acid and the further operations are carried out as indicated in this example, a similar dyestuff with a more bluish hue is obtained.

(10) 305 parts of 3-methy-5-bromo-1-phenylthioglycol-2-carboxylic acid (prepared according to German Patent 239,094) are heated with 326 parts of 5-ethyoxy-1.2-dihydro-2-ketothionaphthene-1-(p-dimethylamino)-anile and 2000 parts of acetic anhydride. The working-up is carried out as indicated in Example (7). The dyestuff thus obtained is identical with that obtained according to Example (8).

11) If for the 2000 parts of acetic anhydride as used in Example (7) are substituted 1500 parts of nitrobenzene and 500 parts of acetic anhydride and the further operations carried out as indicated in this example, a dyestuff of the same properties is obtained.

The properties of the vat dyes produced according to this invention may in general be characterized as follows: In the form of a dry powder they are of a red color. They are insoluble in water, alcohol and ether. They dissolve in nitrobenzene with the formation of red solution and in concentrated sulphuric acid with the formation of a green solution. They dissolve readily in alkaline hydrosulfite solutions forming yellow vats from which animal and vegetable fibers are dyed red shades. The dyes produced possess excellent fastness to light, chlorine, washing, alkalies and acids.

Throughout the specification the numbering recommended by chemical abstracts has been used in designating the chemical compounds used or prepared in the processes described herein.

Having now described our invention what we claim is:

1. As new products, the herein described asymmetrical vat dyestuffs of the thioindigo series having most probably the following formula:

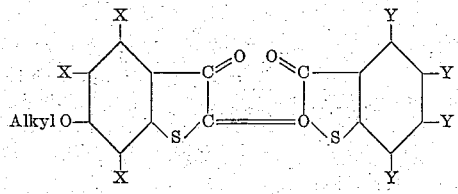

wherein X and Y represent hydrogen or any substitutent, at least one Y being a substitutent, the constitution being such that the left-hand side of the formula is not identical with the right-hand side of the formula, which dyestuffs are in a dry state red powders, insoluble in water, alcohol and ether, soluble in nitrobenzene with a red color, soluble in concentrated sulfuric acid with a green color, forming with an alkaline hydrosulfite solution yellow vats, from which animal and vegetable fibers are dyed red shades which are fast to light, chlorine and washing.

2. As new products, the indigoid dyestuffs of the formula:

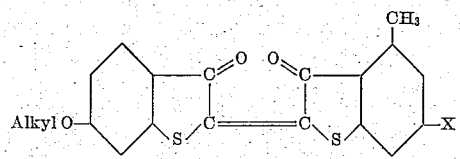

in which X stands for halogen, being in a dry state red powders, insoluble in water, alcohol and ether, soluble in nitrobenzene with a red color, soluble in concentrated sulfuric acid with a green color, forming with an alkaline hydrosulfite solution yellow vats, from which animal and vegetable fibers are dyed red shades which are fast to light, chlorine and washing.

3. As new products, the indigoid dyestuffs of the formula:

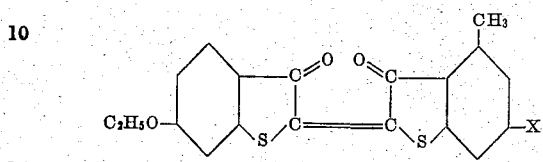

in which X stands for a halogen, being in a dry state red powders, insoluble in water, alcohol and ether, soluble in nitrobenzene with a red color, soluble in concentrated sulfuric acid with a green color, forming with an alkaline hydrosulfite solution yellow vats, from which animal and vegetable fibers are dyed red shades which are fast to light, chlorine and washing.

4. As new products, the herein described vat dyestuffs of the thioindigo series, having most probably the following general structural formula:

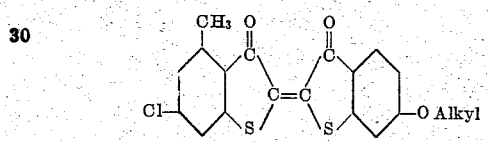

being in a dry state red powders, insoluble in water, alcohol and ether, soluble in nitrobenzene with red color, soluble in concentrated sulfuric acid with a green color, forming with an alkaline hydrosulfite solution yellow vats, from which animal and vegetable fibers are dyed red shades which are fast to light, chlorine and washing.

5. As a new product, the herein described vat dyestuffs of the thioindigo series having the following structural formula:

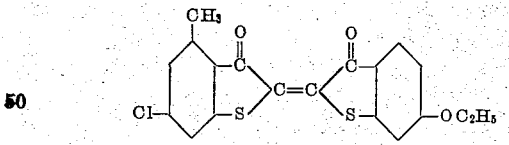

derived by the condensation of a 1-anile of 3-methyl-5-chlor-1.2-diketo-dihydro-thionaphthene with 5-ethoxy-2-keto-thionaphthene, being in a dry state a red powder, insoluble in water, alcohol and ether; soluble in nitrobenzene with an orange-red color and yielding in concentrated sulfuric acid a green solution, forming with an alkaline hydrosulfite solution a yellow vat from which animal and vegetable fibers are dyed bright red shades, fast to light, chlorine and washing.

6. As new products, the herein described vat dyes of the thioindigo series, having most probably the following general structural formula:

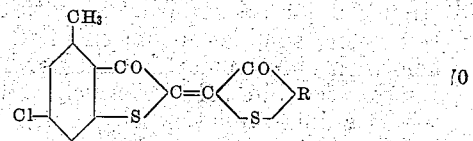

wherein R indicates an aryl group, containing as a substituent an alkyl-oxy group, being in a dry state red powders, insoluble in water, alcohol and ether, soluble in nitrobenzene with a red color, soluble in concentrated sulfuric acid with a green color, forming with an alkaline hydrosulfite solution yellow vats, from which animal and vegetable fibers are dyed red shades, which are fast to light, chlorine and washing.

7. As new products, the indigoid dyestuffs of the following formula:

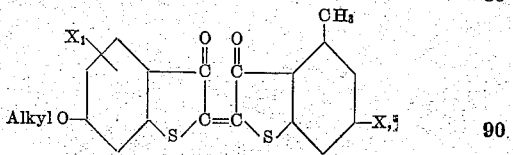

wherein $X_1$ represents hydrogen or halogen and X stands for halogen being in a dry state red powders insoluble in water, alcohol and ether, soluble in nitrobenzene with a red color, soluble in concentrated sulfuric acid with a green color, forming with an alkaline hydrosulfite solution yellow vats, from which animal and vegetable fibers are dyed red shades which are fast to light, chlorine and washing.

8. As new products, the indigoid dyestuffs of the following formula:

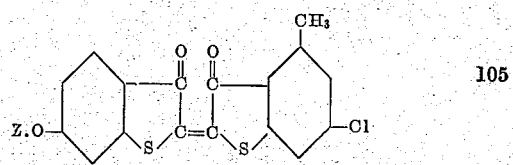

wherein Z stands for methyl or ethyl being in a dry state red powders insoluble in water, alcohol and ether, soluble in nitrobenzene with a red color, soluble in concentrated sulfuric acid with a green color, forming with an alkaline hydrosulfite solution yellow vats, from which animal and vegetable fibers are dyed red shades which are fast to light, chlorine and washing.

9. As a new product, the herein described thioindigo vat dye of the following probable structural formula:

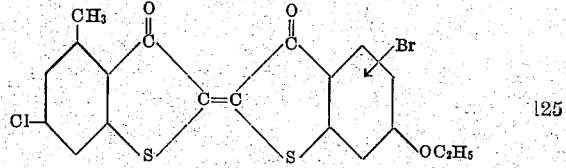

which is obtainable by condensing a 1-anile of 3-methyl-5-chloro-1.2-diketo-dihydro-thionapthene with a bromo-5-ethoxy-2-keto-thionaphthene; being in a dry state a bright red powder, insoluble in water, alcohol and ether, soluble in nitrobenzene with a bluish-red color, soluble in concentrated sulfuric acid with a green color, forming with an alkaline hydrosulfite solution a yellow vat from which animal and vegetable fibers are dyed bright bluish-red shades fast to light, chlorine and washing.

In testimony whereof, we affix our signatures.

KARL SCHIRMACHER.
KARL ZAHN.
ERWIN HOFFA.
HANS HEYNA.